United States Patent
Tanii et al.

(10) Patent No.: US 8,822,049 B2
(45) Date of Patent: Sep. 2, 2014

(54) BATTERY UNIT AND ELECTRICAL DEVICE

(75) Inventors: Keiichi Tanii, Ibaraki (JP); Masatoshi Hashimoto, Ibaraki (JP); Kyohei Takeuchi, Ibaraki (JP); Takahiro Shimada, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 0 days.

(21) Appl. No.: 14/000,325

(22) PCT Filed: Feb. 23, 2011

(86) PCT No.: PCT/JP2011/054049
§ 371 (c)(1),
(2), (4) Date: Aug. 19, 2013

(87) PCT Pub. No.: WO2012/114489
PCT Pub. Date: Aug. 30, 2012

(65) Prior Publication Data
US 2013/0323538 A1    Dec. 5, 2013

(51) Int. Cl.
*H01M 2/02* (2006.01)
*H01M 10/42* (2006.01)
*H01M 2/10* (2006.01)

(52) U.S. Cl.
CPC ........ *H01M 2/0222* (2013.01); *H01M 10/4257* (2013.01); *Y02E 60/12* (2013.01); *H01M 2/1038* (2013.01)
USPC .............................................. 429/7; 429/163

(58) Field of Classification Search
USPC .............................. 429/7, 163, 164, 178, 181
See application file for complete search history.

(56) References Cited

U.S. PATENT DOCUMENTS

| | | | |
|---|---|---|---|
| 6,676,440 B1 | 1/2004 | Inamine et al. | |
| 2005/0064286 A1* | 3/2005 | Kozu et al. | 429/180 |
| 2007/0207380 A1* | 9/2007 | Tononishi | 429/176 |
| 2009/0136843 A1 | 5/2009 | Yamamoto et al. | |

FOREIGN PATENT DOCUMENTS

| | | |
|---|---|---|
| JP | 05-84147 U | 11/1993 |
| JP | 2002-298804 A | 10/2002 |
| JP | 2009-152183 A | 7/2007 |
| JP | 2009-087554 A | 4/2009 |
| JP | 3159789 U | 6/2010 |
| JP | 2010-205700 A | 9/2010 |

OTHER PUBLICATIONS

International Search Report for PCT/JP2011/054049, Mailing Date of May 31, 2011.
Written Opinion for PCT/JP2011/054049, Mailing Date of May 31, 2011.

* cited by examiner

*Primary Examiner* — Mark F Huff
*Assistant Examiner* — Monique Wills
(74) *Attorney, Agent, or Firm* — Westerman, Hattori, Daniels & Adrian, LLP

(57) ABSTRACT

A battery unit provided with a flat battery and a substrate having a circuit formed thereon is provided in a compact form as a whole. The battery unit (1) includes a flat battery (2) in a flat shape having an upper surface and a bottom surface and a substrate (61) fixed to one surface of the flat battery (2). A circuit component (62) is mounted on a surface of the substrate (61) on a side of the flat battery (2), and a positive electrode terminal (68) (charging terminal) electrically connected to a positive electrode side of the flat battery (2) and a negative electrode terminal (66) (GND terminal) electrically connected to a negative electrode side of the flat battery (2) are formed on a surface of the substrate (61) on the opposite side to the flat battery (2).

10 Claims, 5 Drawing Sheets

BATTERY UNIT AND ELECTRICAL DEVICE

TECHNICAL FIELD

The present invention relates to a battery unit including a flat battery and an electrical device that can be mounted with the battery unit.

BACKGROUND ART

A conventional arrangement including a battery and a protection circuit as a unit has been known. An example of such an arrangement includes a battery case and a protection circuit and the like provided thereon as disclosed by JP 2009-152183 A.

DISCLOSURE OF THE INVENTION

The disclosed arrangement has a space for providing the protection circuit on the battery case because a battery pack having a relatively large size is used. However, if a battery is made of a flat battery such a coin battery, a substrate provided with a protection circuit, terminals and other elements thereon could be larger than the flat battery because the flat battery has a significantly small size as compared to the battery pack. This can increase the size of the battery unit as a whole, which, in some cases, makes it difficult to apply the unit to a small-size device that may operate with a flat battery.

It is therefore an object of the present invention to provide a battery unit including a flat type battery and a substrate having a circuit thereon that allows the battery unit as a whole to be compact.

A battery unit according to one embodiment of the present invention includes a flat battery in a flat shape having an upper surface and a bottom surface and a substrate fixed to one of the upper surface and the bottom surface of the flat battery, a circuit component is mounted on a surface of the substrate on the flat battery side, and a positive electrode terminal electrically connected to a positive electrode side of the flat battery and a negative electrode terminal electrically connected to a negative electrode side of the flat battery are formed on a surface of the substrate on an opposite side to the flat battery (a first configuration).

According to the above-described configuration, the substrate is fixed to one surface of the flat battery, and therefore the substrate and the flat battery can be provided in a compact manner in their thickness-wise direction. Furthermore, the positive electrode terminal and the negative electrode terminal are provided on the surface of the substrate on the opposite side to the flat battery, and therefore the positive electrode terminal and the negative electrode terminal can be formed in a position that overlaps the flat battery when viewed in the direction in the substrate and the flat battery are placed on each other. In this way, in the battery unit including the flat battery and the substrate, the flat battery can be compact in the radial direction of the flat battery.

Furthermore, circuit components are mounted on the surface of the substrate on the flat battery side, and therefore the positive electrode terminal and the negative electrode terminal can be formed on the surface of the substrate on the opposite side to the flat battery, so that the battery unit can be reduced in thickness. In addition, the circuit components are mounted on the surface of the substrate on the flat battery side, so that a user can be prevented from directly touching the circuit components for example during battery exchange.

In the first configuration, the flat battery has a cylindrical exterior can with a bottom and a sealing can adapted to cover an opening side of the exterior can, and the substrate is fixed on the upper surface formed by the sealing can (a second configuration). In a flat battery in general, a sealing can is less likely to deform than an exterior can. Therefore, fixing the substrate on the upper surface formed by the sealing can as described above can prevent the substrate from being affected by the deformation of the flat battery. More specifically, if the flat battery deforms, electrical contact between the substrate and the flat battery can be secured in the above-described structure.

In the second configuration, the positive electrode terminal is electrically connected to one of the sealing can and an outer circumferential side part of the exterior can fitted to the sealing can, and the negative electrode terminal is electrically connected to the other of the sealing can and the outer circumferential side part of the exterior can to which the positive electrode terminal is not electrically connected (a third configuration).

In this manner, the positive electrode terminal and the negative electrode terminal can be electrically connected to the sealing can and the exterior can. In this way, the first and second configurations can be implemented.

In one of the first to third configurations, the substrate is fixed to the flat battery at such a distance to the flat battery that the circuit component does not contact the flat battery (a fourth configuration).

In this way, there is a distance between the circuit component mounted on the substrate and the flat battery that keeps them from contacting each other, and therefore the circuit component can be prevented from contacting the flat battery and deforming as a result even when the flat battery deforms to some extent.

In the fourth configuration, a spacer adapted to provide the distance is provided between the substrate and the flat battery (a fifth configuration). In this way, the above-described fourth configuration can be implemented easily.

In one of the first to fifth configurations, the substrate has a shape and a size equal to an outer shape of the flat battery as the substrate is provided on the flat battery (a sixth configuration). In this way, the battery unit having the substrate fixed on the flat battery can be reduced in size.

In one of the first to sixth configurations, a layered body including the flat battery and the substrate has at least a side surface covered with a resin material (a seventh configuration). In this way, the layered body including the flat battery and the substrate may have improved strength and the side surface of the layered body may have improved appearance.

In the seventh configuration, outer circumferential sides of both end surfaces of the layered body are covered with the resin material (an eighth configuration). In this way, the layered body may be held in the thickness-wise direction by the resin material, and the strength of the layered body may be further improved. In addition, in this way, a step as thick as the resin material forms at an end surface of the layered body, and therefore when the battery unit is provided for example on a flat board, the end surface of the battery unit (a substrate surface in particular) can be prevented from directly contacting the flat board. This further ensures that damage to the positive electrode terminal and the negative electrode terminal formed on the substrate can be prevented.

An electrical device according to one embodiment of the present invention includes a case capable of storing the battery unit according to any one of first to eighth configurations, and the case has a plurality of openings from which the positive and negative electrode terminals of the battery unit are exposed (a ninth configuration).

In the above-described configuration, the positive and negative electrode terminals of the battery unit are exposed to the case of the electrical device and therefore the battery unit can be charged while the battery unit is still mounted to the electrical device.

According to one embodiment of the present invention, a battery unit as a whole that includes a flat battery and a substrate having a circuit thereon can be provided in a compact manner.

MODE FOR CARRYING OUT THE INVENTION

Figure 1:
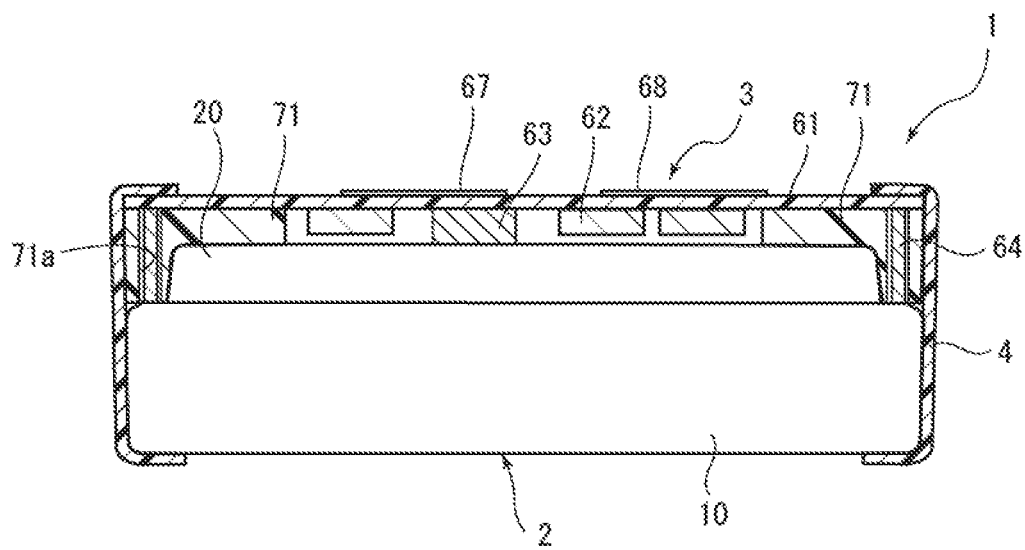
FIG. 1 is a view of a general structure of a battery unit according to an embodiment of the invention.

Hereinafter, an embodiment of the present invention will be described in detail in conjunction with the accompanying drawings in which the same or corresponding portions are designated by the same reference characters, and their description will not be repeated.

Overall Structure

FIG. 1 is a view of a general structure of a battery unit 1 according to an embodiment of the present invention. The battery unit 1 includes an integral arrangement of a coin shaped flat battery 2 and a circuit portion 3. The battery unit 1 is for example used as a power source for a small size device that uses a coin type battery such as a pedometer, a hearing aid, an electronic key for automobile, an IC tag, and a sensor unit.

More specifically, as shown in FIG. 1, in the battery unit 1, the circuit portion 3 is provided on an upper surface of the flat battery 2 and adhesively fixed for example with an elastic adhesive. The circuit portion 3 has a size and a shape equal to those of the outer shape of the flat battery 2 as viewed in a direction in which the flat battery 2 and the circuit portion 3 are placed on each other. In this way, the flat battery 2 and the circuit portion 3 can be arranged in a compact manner in the thickness-wise direction while the battery unit 1 can have a size and a shape equal to those of the outer shape of the flat battery 2 as viewed in the direction in which the flat battery 2 and the circuit portion 3 are placed on each other. Note that the use of the elastic adhesive for adhering the flat battery 2 and the circuit portion 3 further ensures that even members having different thermal deformation amounts can be adhered with each other by the adhesive.

Figure 2:
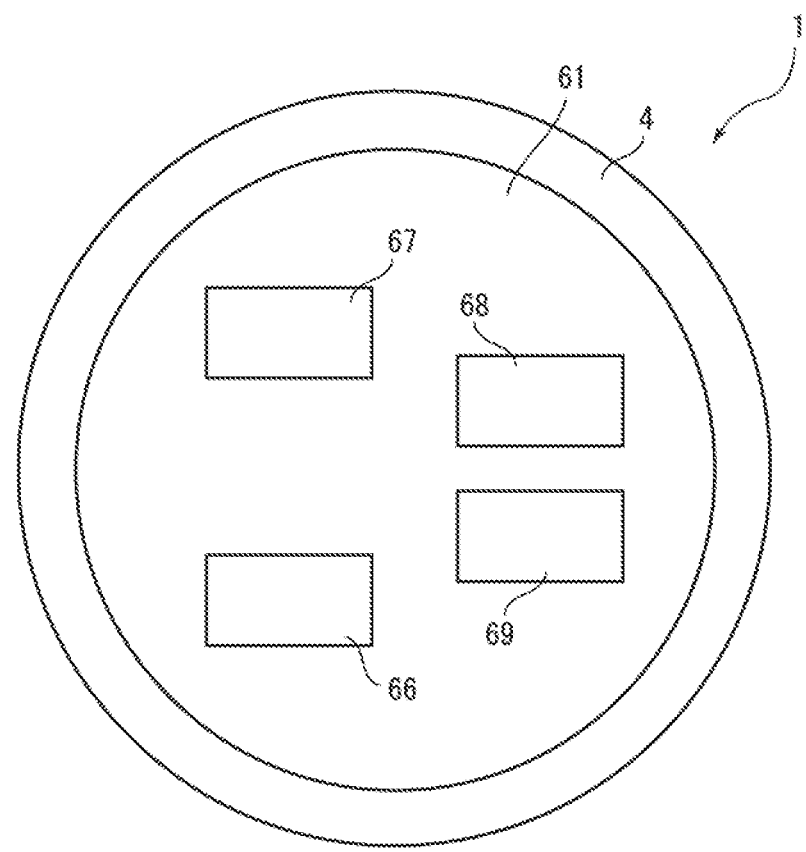
FIG. 2 is a top view of the battery unit.

As will be described in detail, various terminals 66 to 69 (that will be described) are formed on a surface of a circuit substrate 61 of the circuit portion 3 on the opposite side to the flat battery 2. In this way, in the battery unit 1, while the flat battery 2 and the circuit portion 3 are assembled as shown in FIG. 1, only the terminals 66 to 69 are exposed as shown in FIG. 2. (Only the output terminal 67 and the charging terminal 68 are shown in FIG. 1.)

Furthermore, as shown in FIG. 1, a side surface of the layered body including the flat battery 2 and the circuit portion 3 fixed as they are layered on each other is covered with a tube 4 (resin member) of a thermally shrinkable resin material such as PET (polyethylene terephthalate). The tube 4 covers not only the side surface of the layered body but also outer circumferential sides of both end surfaces of the layered body (an outer circumferential side of the substrate 61 of the circuit portion 3 and an outer circumferential side of the bottom of the exterior can 10 of the flat battery 2). In this way, said layered body may have improved strength and the side surface of the layered body may have improved appearance. A step as thick as the tube 4 forms at an end surface of the layered body, so that the terminals 66 to 69 formed at the outer surface of the circuit portion 3 positioned at the end surface of the layered body are provided on the inner side than the tube 4 and thus less prone to damage.

In the following, referring to FIGS. 1 to 4, the flat battery 2 and the circuit portion 3 will be described in detail.

Figure 3:
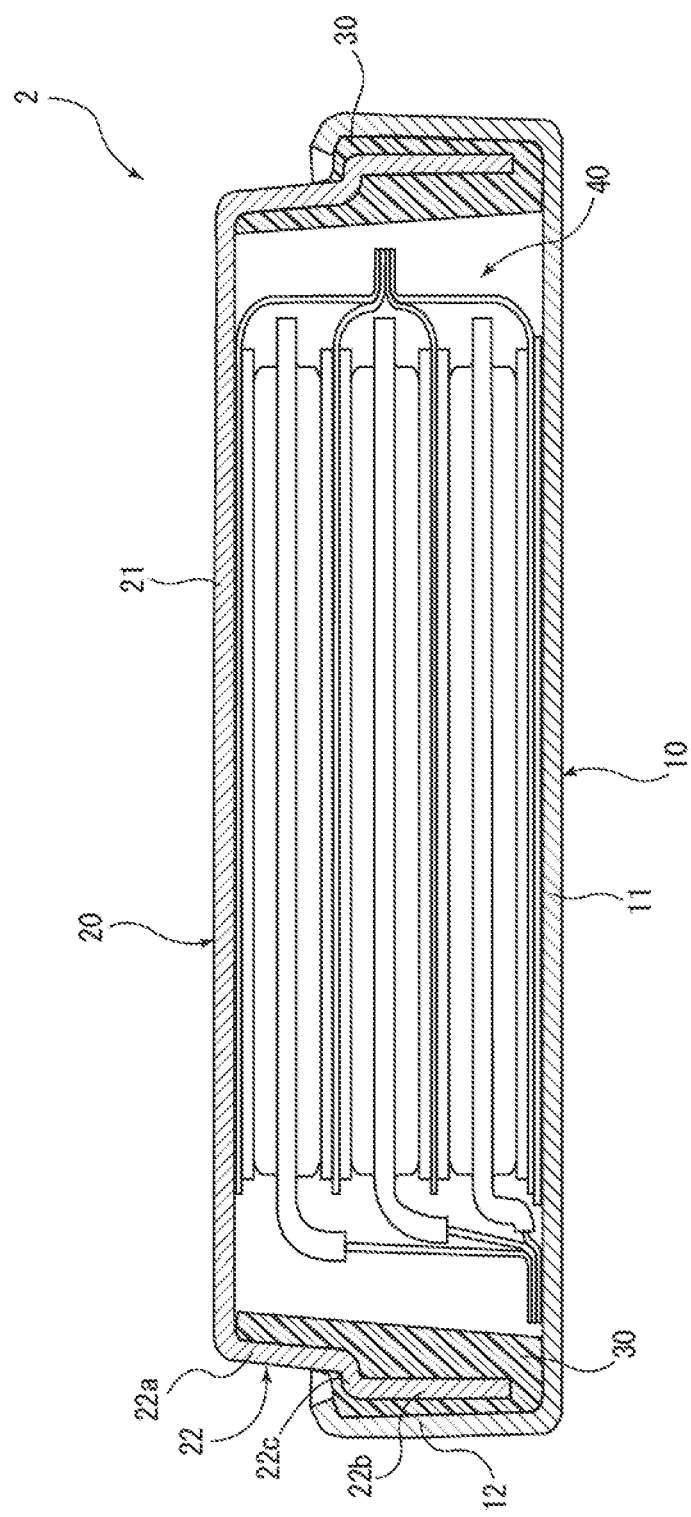
FIG. 3 is a sectional view of a general structure of a flat battery.

As shown in FIG. 3, the flat battery 2 includes a positive electrode can 10 as a cylindrical exterior can with a bottom, a negative electrode can 20 as a sealing can that covers the opening of the positive electrode can 10, a gasket 30 provided between the outer circumferential side of the positive electrode can 10 and the outer circumferential side of the negative electrode can 20, and an electrode member 40 stored in a space formed between the positive electrode can 10 and the negative electrode can 20. Therefore, the flat battery 2 is formed to have a flat coin shape as a whole as the positive electrode can 10 and the negative electrode can 20 are joined. A non-aqueous electrolyte (not shown) is also enclosed in the space formed between the positive electrode can 10 and the negative electrode can 20 in addition to the electrode member 40. Note that according to the embodiment, the flat battery 2 is formed as a lithium ion battery.

The positive electrode can 10 is made of a metal material such as stainless steel and formed to have a cylindrical shape with a bottom for example by press-molding. The positive electrode can 10 includes the circular bottom 11 and a cylindrical circumferential wall 12 formed continuously with the bottom 11 at its outer circumference. The circumferential wall 12 is provided to extend substantially perpendicularly from the outer circumferential end of the bottom 11 when viewed in a longitudinal section (in a state shown in FIG. 1). As will be described, while the gasket 30 is held between the positive electrode can 10 and the negative electrode can 20, the opening end side of the circumferential wall 12 is bent inwardly and caulked to the negative electrode can 20. In this way, the bottom 11 of the positive electrode can 10 forms the bottom of the flat battery 2.

The negative electrode can 20 is made of a metal material such as stainless steel and formed to have a cylindrical shape with a bottom by press-molding similarly to the positive electrode can 10. The negative electrode can 20 has a cylindrical circumferential wall 22 whose outer size is smaller than that of the circumferential wall 12 of the positive electrode can 10 and a circular flat surface 21 that blocks one opening of the circumferential wall 12. Therefore, the flat surface 21 of the negative electrode can 20 forms the upper surface of the flat battery 2.

The circumferential wall 22 of the negative electrode can 20 is provided to extend substantially perpendicularly with respect to the flat surface 21 when viewed in a longitudinal section similarly to the positive electrode can 10. The circumferential wall 22 has a large diameter part 22b whose diameter increases stepwise as compared to a base end 22a on the side of the flat surface 21. More specifically, a stepped part 22c is formed between the base end 22a and the large diameter part 22b. As shown in FIG. 3, the opening end side of the circumferential wall 12 of the positive electrode can 10 is bent and caulked to the stepped part 22c. More specifically, the circumferential wall 12 of the positive electrode can 10 has its opening end side fitted to the stepped part 22c of the negative electrode can 20.

As shown in FIG. 1, the circuit portion 3 includes a circuit substrate 61 and a plurality of circuit components 62 mounted on the circuit substrate 61. The plurality of circuit components 62 are mounted together on one surface side of the circuit substrate 61. Examples of the circuit components 62 include a protection IC that forms a protection circuit, a charging IC that forms a charging circuit, and a DC/DC converter that carries out voltage conversion. Using the DC/DC converter provided in the battery unit 1, voltage to be output from the battery unit 1 can conform to the rated voltage of an electrical device to be used even if the rated voltage of the flat battery 2 is different from the rated voltage of the electrical device. Therefore, the battery unit 1 can be formed using flat batteries with various kinds of rated voltage. Although not detailed, the circuit portion 3 is adapted to change the output voltage when the remaining capacity of the flat battery 2 is reduced in order to detect the remaining capacity of the flat battery 2.

The circuit substrate 61 is formed to have a shape (circular) and a size equal to those of the outer shape of the flat battery 2 when seen in a plan view. In this way, the battery unit 1 can be prevented from having a larger size than the diameter of the flat battery 2 because of the circuit substrate 61. According to the embodiment, the circuit substrate 61 has a flat shape but it may be in a different shape or formed integrally with a spacer 71 that will be described.

The GND terminal 66 (negative electrode terminal), the output terminal 67 (positive electrode terminal), the charging terminal 68 (positive electrode terminal), and the charging indication signal terminal 69 are provided on the surface of the circuit substrate 61 where the circuit components 62 are not provided (see FIG. 2). More specifically, the circuit substrate 61 includes the plurality of circuit components 62 mounted on its one side and the various terminals 66 and 69 provided together on the other surface side as shown in FIG. 1. The circuit substrate 61 has a plurality of through holes filled with a metal material which electrically connects the circuit components 62 and the various terminals 66 to 69 mounted on the circuit substrate 61.

Here, as shown in FIG. 2, among the various terminals 66 to 69, the distance between the output terminal 67 and its adjacent terminal (GND terminal 66) is greater than the distance between the charging terminal 68 and its adjacent terminal (charging indication signal terminal 69) so that the output terminal 67 and the charging terminal 68 can easily be distinguished from each other.

As shown in FIG. 1, at the surface of the circuit substrate 61 mounted with the circuit components 62, a connection terminal 63 connected to the negative electrode can 20 (negative electrode side) of the flat battery 2 and connection pins 64 connected to the positive electrode can 10 (positive electrode side) of the flat battery 2 are provided. The connection terminal 63 and the connection pins 64 are adapted to electrically connect the flat battery 2 and the circuit components 62 on the circuit substrate 61. In this way, the various terminals 66 to 69 formed on the circuit substrate 61 are also electrically connected to the flat battery 2 through the connection terminal 63 and the connection pins 64.

The connection terminal 63 is a member made of a conductive metal material such as copper and serves not only as a connection member that electrically connects the flat battery 2 and the circuit substrate 61 but also as a spacer between the flat battery 2 and the circuit substrate 61. More specifically, the connection terminal 63 is formed to have a height greater than the circuit components 62, so that it is electrically connected to the circuit substrate 61 and the flat battery 2 while being positioned between the circuit substrate 61 and the flat battery 2. Note that according to the embodiment, the connection terminal 63 also serves as a spacer but a spacer may be provided separately from the connection terminal 63.

The connection pin 64 is a member made of a conductive metal material such as copper and formed to have an elongate pin shape. According to the embodiment, two of the connection pins 64 are provided in opposing positions with the flat battery 2 therebetween as shown in FIG. 1. In this way, multiple connection pins 64 are provided to further ensure that the circuit substrate 61 and the flat battery 2 are electrically connected. Note that the number of connection pins 64 may be one or three or more.

The circuit substrate 61 is held on the negative electrode can 20 of the flat battery 2 through the spacer 71. More specifically, the circuit substrate 61 is provided at a prescribed distance from the negative electrode can 20 of the flat battery 2 by the spacer 71 while it is adhesively fixed to the negative electrode can 20 by an elastic adhesive. Therefore, the elastic adhesive is filled between the circuit substrate 61 and the negative electrode can 20 of the flat battery 2. The circuit substrate 61 is thus provided at the negative electrode can 20 that is less prone to deformation in the flat battery 2, so that electrical connection between the circuit substrate 61 and the flat battery 2 can be secured even when the flat battery 2 deforms.

Figure 4:
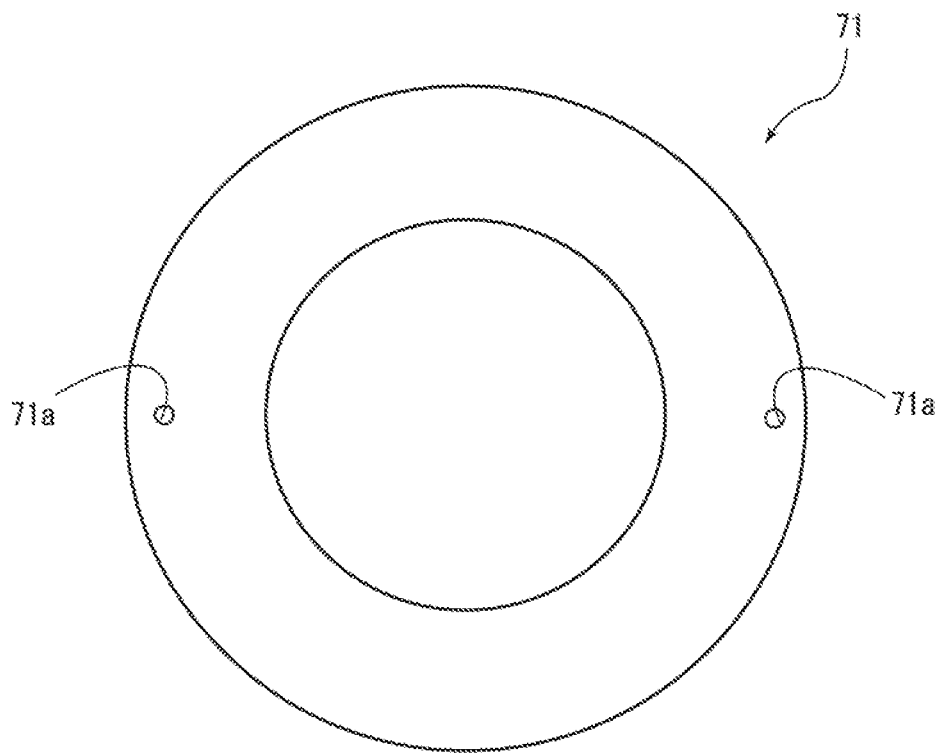
FIG. 4 is a view of a general structure of a spacer.

The spacer 71 is a member made of a resin material such as ABS resin (acrylonitrile butadiene styrene copolymer synthetic resin) and phenolic resin and has a substantially doughnut shape as shown in FIG. 4. As shown in FIG. 1, the spacer 71 is formed to have a large thickness at the outer circumferential side part along the stepped part so as to fill the stepped part between the negative electrode can 20 and the positive electrode can 10 of the flat battery 2. More specifically, the spacer 71 has its outer circumferential side part formed to extend to the caulking part (hereinafter also referred to as "shoulder part") with the negative electrode can 20 at the positive electrode can 10. The spacer 71 has a thickness to provide a prescribed distance between the flat battery 2 and the circuit substrate 61 such that the circuit components 62 and the flat battery 2 are kept from contacting with one another. In this way, if the flat battery 2 deforms, the circuit components 62 can be prevented from contacting the flat battery 2 and being damaged as a result.

The circuit substrate 61 is joined to the spacer 71 so that the circuit components 62 are positioned inside the substantially doughnut shaped spacer 71 (see FIG. 1). In this way, the circuit substrate 61 mounted with the circuit components 62 can be arranged in a compact manner with respect to the flat battery 2. The above-described arrangement keeps the circuit components 62 from being exposed to the outside of the battery unit 1, so that for example a user can be prevented from touching the circuit components 62.

Note that as in the foregoing, the elastic adhesive is filled between the circuit substrate 61 and the negative electrode can 20 of the flat battery 2, so that the elastic adhesive is also filled around the circuit components 62 provided inside the substantially doughnut shaped spacer 71.

As shown in FIGS. 1 and 4, through holes 71a through which the above-described connection pins 64 are provided are formed on the outer circumferential side of the spacer 71. The through holes 71a are formed at the outer circumferential part of the large thickness part of the spacer 71 as shown in FIG. 1. In this way, the connection pins 64 provided through the through holes 71a contact the shoulder part of the positive electrode can 10 caulked to the negative electrode can 20 in the flat battery 2.

Figure 5:
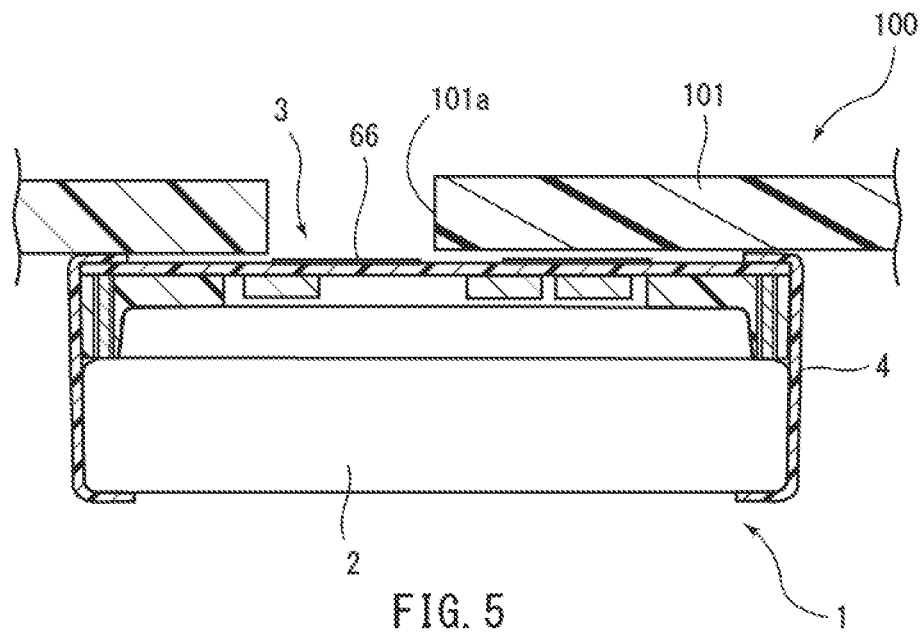
FIG. 5 shows how the battery unit is mounted on an electrical device.

FIG. 5 shows how the battery unit 1 having the above-described structure is provided in a small size electrical device 100 such as a pedometer and a hearing aid. The case 101 of the electrical device 100 has an opening 101a from which the GND terminal 66 and the charging terminal 68 of the battery unit 1 are exposed. The opening 101a allows the battery unit 1 to be charged while the battery unit 1 is mounted in the case 101 of the electrical device 100. Therefore, the battery unit 1 can be charged without being detached from the electrical device 100, which alleviates labor related to charging.

Method of Manufacturing Battery Unit 1

Now, a method of manufacturing the battery unit 1 having the above-described structure will be described with reference to FIGS. 6 and 7.

Figure 6:
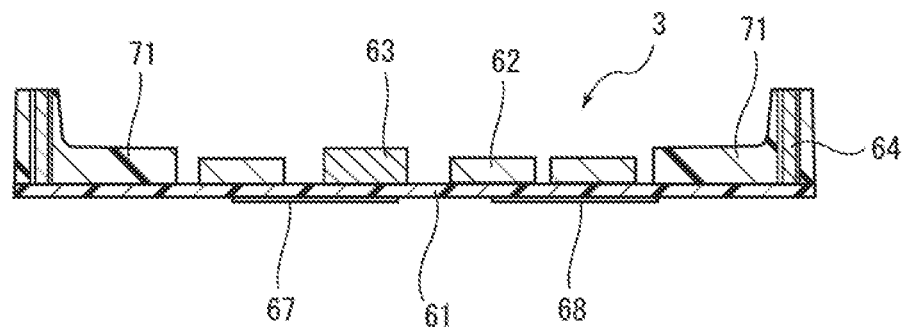
FIG. 6 shows how a circuit portion is formed in an example of a method of manufacturing a battery unit.

As shown in FIG. 6, the plurality of circuit components 62 are mounted on one surface side of the circuit substrate 61 together with the connection terminal 63 and the connection pins 64. At the time, the various terminals 66 to 69 are formed on the other surface side of the circuit substrate 61.

As shown in FIG. 6, the spacer 71 is adhesively fixed to the circuit substrate 61 with an elastic adhesive while the circuit substrate 61 is provided so that said one surface is on the upper side.

Figure 7:
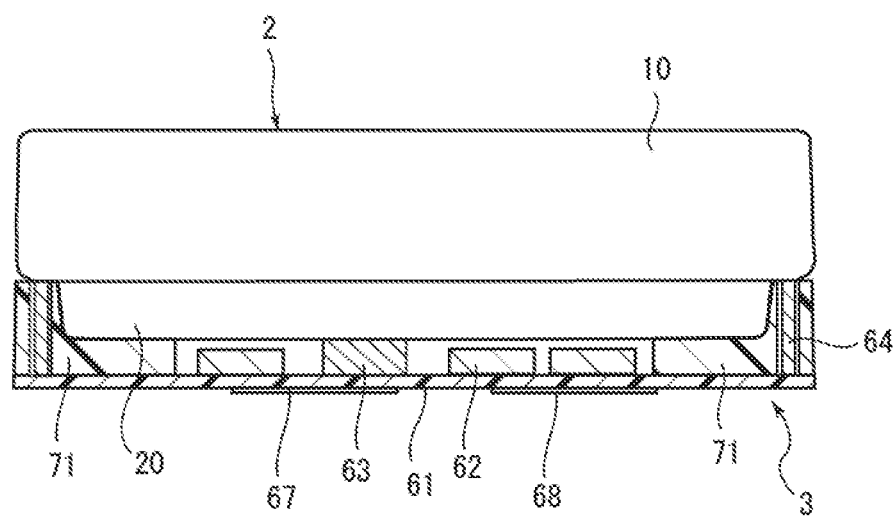
FIG. 7 shows how a flat battery is assembled to a circuit portion in an example of a method of manufacturing a battery unit.

Thereafter, for example an elastic adhesive (not shown) is applied on the circuit substrate 61 and the spacer 71 and the flat battery 2 is attached on the circuit substrate 61 and the spacer 71 as the negative electrode can 20 is positioned on the lower side as shown in FIG. 7. Then, the elastic adhesive is dried to arrange the flat battery 2, the spacer 71, and the circuit substrate 61 in an integral manner. Note that the elastic adhesive must be applied carefully to the circuit substrate 61 and the spacer 71, so that the elastic adhesive does not stick to tip ends of the connection terminal 63 and the connection pins 64. The elastic adhesive is not applied on the part of the spacer 71 positioned at the shoulder part of the positive electrode can 10. In this way, deformation of the caulking part caused by increased internal pressure in the flat battery 2 is not prevented.

Then, the tube 4 is fitted to the side surface of the layered body including the flat battery 2 and the circuit portion 3 formed as described above, followed by heating, so that the tube 4 is shrunk. Note that the tube 4 has a length to cover a part of the outer circumferential sides of both end surfaces of the layered body while being fitted to the side surface of the layered body.

In this way, the battery unit 1 having the structure as shown in FIG. 1 is obtained.

Advantages of the Invention

As in the foregoing, according to the embodiment, the flat battery 2 is attached with the circuit portion 3 in an integral form and thus the battery unit 1 is formed. The various terminals 66 to 69 are provided together on the surface of the circuit substrate 61 of the circuit portion 3 on the opposite side to the flat battery 2, so that the terminals 66 to 69 can be provided in a position that overlaps the flat battery 2 when seen in a plan view, which allows the battery unit 1 to be compact. In addition, the circuit components 62 are mounted together on the surface of the circuit substrate 61 on the side of the flat battery 2, so that the circuit components 62 and the like can be prevented from being exposed to the outside of the battery unit 1. In this way, a user while touching the battery unit 1 can be prevented from directly touching the circuit components 62 and the like.

The circuit portion 3 is provided on the negative electrode can 20 that is less prone to deformation in the flat battery 2, so that electrical connection between the flat battery 2 and the circuit portion 3 can be prevented from being interrupted as the flat battery 2 deforms. In other words, providing the circuit portion 3 on the negative electrode can 20 secures electrical connection between the circuit portion 3 and the flat battery 2 if the flat battery 2 deforms.

Furthermore, the spacer 71 is provided between the circuit substrate 61 and the flat battery 2 so that a distance that keeps the circuit components 62 from contacting the flat battery 2 is provided. In this way, if the flat battery 2 deforms, the circuit components 62 can be prevented from contacting the flat battery 2.

The side surface of the layered body including the flat battery 2 and the circuit portion 3 is covered with the resin tube 4, so that the layered body may have improved strength and the side surface of the layered body may have improved appearance. In addition, a step is formed by the tube 4 at the end surface of the layered body, and damage to the terminals 66 to 69 on the circuit substrate 61 of the circuit portion 3 can be reduced.

Modification of the Embodiment

Figure 8:
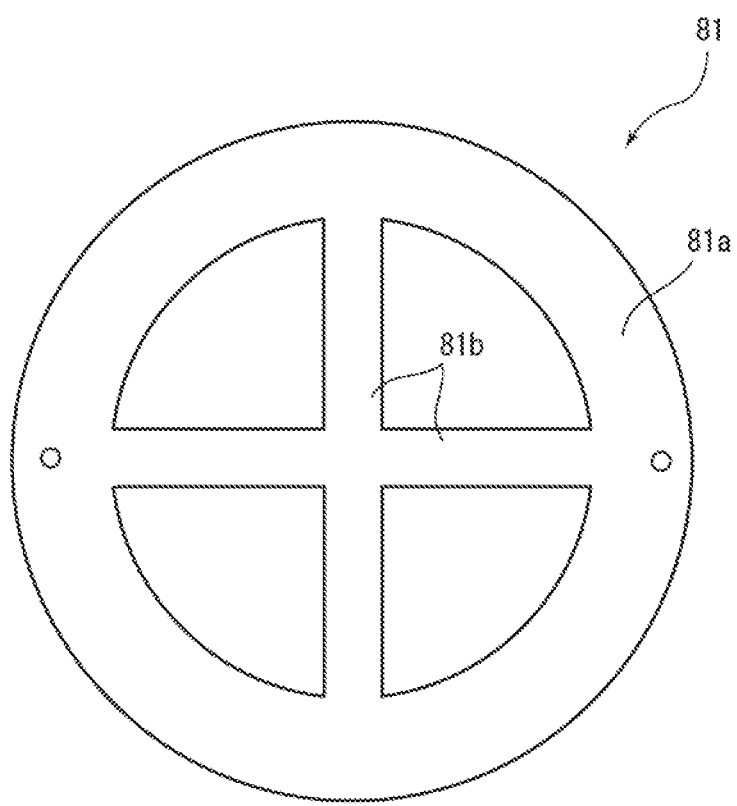
FIG. 8 is a view of a general structure of a spacer for use in a battery unit according to a modification of the embodiment.

FIG. 8 shows a general structure of a spacer 81 for use in a battery unit according to a modification of the above-described embodiment. The modification has the same arrangement as that of the above-described embodiment except for the structure of the spacer 81, and therefore the same portions as those of the embodiment will be designated by the same reference characters and their description will not be repeated.

More specifically, as shown in FIG. 8, the spacer 81 has a circular outer rib 81a and inner ribs 81b provided in a cross shape in the outer rib 81a. In the spacer 81, the outer rib 81a and the inner ribs 81b are integrally formed.

According to the modification, circuit components 62 are mounted on a circuit substrate 61 inside the outer rib 81a of the spacer 81 so as to avoid the inner ribs 81b while the circuit substrate 61 is assembled to the spacer 81.

The above-described arrangement of the spacer 81 increases the rigidity of the spacer 81 and the distance between the circuit substrate 61 and the flat battery 2 can be more surely secured by the spacer 81.

Note that the number of inner ribs 81b inside the spacer 81 may be one to three or five or more.

Other Embodiments

Although the embodiment of the present invention has been described and illustrated, the same is by way of illustration and example only and is not to be taken by way of limitation. The embodiment can therefore be modified in various forms without departing the spirit and scope of the present invention.

According to the embodiment, the spacers 71 and 81 are used to provide a distance between the circuit substrate 61 and the flat battery 2. However, the distance may be provided using an adhesive without providing the spacers 71 and 81. In the latter case, at least one of the circuit portion 3 and the flat battery 2 needs only be held such that the distance exists between the circuit portion 3 and the flat battery 2 when the battery unit is formed.

According to the embodiment, the circular spacers 71 and 81 are used, but the spacers may have any shape as far as they each serve as a spacer to provide a distance between the circuit substrate 61 and the flat battery 2.

According to the embodiment, the side surface of the layered body including the circuit portion 3 and the flat battery 2 is covered with the tube 4, but it does not have to be covered with the tube 4. In this case, the battery unit may be more compact without the tube 4. Alternatively, the side surface of the layered body may be coated with a resin material rather than being covered with the tube according to the embodiment.

According to the embodiment, the circuit substrate 61 has a shape and a size equal to those of the outer shape of the flat battery 2, but the circuit substrate 61 may have a smaller or larger size than the flat battery 2. The circuit substrate 61 may have a shape other than the circular shape.

According to the embodiment, there is a prescribed distance between the circuit components 62 of the circuit portion 3 and the flat battery 2, but the distance may not be necessary. The circuit portion 3 may be provided on the side of the positive electrode can 10 as the exterior can of the flat battery 2 rather than on the side of the negative electrode can 20 as the sealing can of the flat battery 2.

According to the embodiment, the flat battery 2 and the circuit portion 3 are adhesively fixed using an elastic adhesive, but they may be fixed using any of other kinds of adhesive materials such as conductive tape.

According to the embodiment, the exterior can is the positive electrode can 10 and the sealing can is the negative electrode can 20, but the exterior can may be the negative electrode can and the sealing can may be the positive electrode can.

According to the embodiment, the flat battery 2 is formed as a lithium ion battery. However, the flat battery 2 may be a battery other than the lithium ion battery as far as it is a chargeable secondary battery. The flat battery 2 may be a primary battery. If the flat battery 2 is a primary battery, a capacitor for example is mounted as a circuit portion.

Industrial Applicability

A battery unit according to the present invention is applicable to an arrangement including a substrate having a circuit formed thereon and a flat battery mounted to a small size device.

The invention claimed is:

1. A battery unit having a substantially circular cylinder shape, comprising:
   a flat battery in a flat shape having a first major flat surface and a second major flat surface, the flat battery having a substantially circular shape in a plan view; and
   a substrate fixed to one of the first major flat surface and the second major flat surface of said flat battery to face said one of the first major flat surface and the second major flat surface of said flat battery,
   a circuit component being mounted on a surface of said substrate facing to said flat battery,
   a positive electrode terminal electrically connected to a positive electrode of the flat battery and a negative electrode terminal electrically connected to a negative electrode of the flat battery being formed on a surface of said substrate that is opposite to the surface facing to said flat battery.

2. The battery unit according to claim 1, wherein said flat battery has a cylindrical exterior can with a bottom and a sealing can adapted to cover an opening of the exterior can, and
   said substrate is fixed on said first major flat surface formed by said sealing can.

3. The battery unit according to claim 2, wherein said positive electrode terminal is electrically connected to one of said sealing can and an outer circumferential part of said exterior can fitted to the sealing can, and
   said negative electrode terminal is electrically connected to the other of said sealing can and the outer circumferential part of said exterior can to which said positive electrode terminal is not electrically connected.

4. The battery unit according to claim 1, wherein said substrate is fixed to said flat battery at such a distance to said flat battery that said circuit component is prevented from contacting the flat battery.

5. The battery unit according to claim 4, wherein a spacer adapted to provide said distance is provided between said substrate and said flat battery.

6. The battery unit according to claim 1, wherein said substrate has a shape and a size equal to an outer shape of the flat battery as said substrate is provided on said flat battery.

7. The battery unit according to claim 1, wherein a layered body including said flat battery and said substrate has at least a side surface covered with a resin material.

8. The battery unit according to claim 7, wherein outer circumferential parts of both end surfaces of said layered body are covered with said resin material.

9. An electrical device, comprising a case capable of storing the battery unit according to claim 1, wherein said case has a plurality of openings from which said positive and negative electrode terminals of said battery unit are exposed.

10. The battery unit according to claim 2, wherein an insulating gasket is provided between said exterior can and said sealing can, and said exterior can is bent inwardly and caulked to the sealing can.

* * * * *